May 30, 1961  W. P. BOARDMAN, JR., ET AL  2,986,219
FREESTREAM RAM AIR TURBINE
Filed May 27, 1957  3 Sheets-Sheet 1

WARREN P. BOARDMAN, JR.,
GEORGE P. CARVER,
WILLIAM W. CARLTON,
JAMES C. WISE,
INVENTORS

BY R. S. Giauque

ATTORNEY

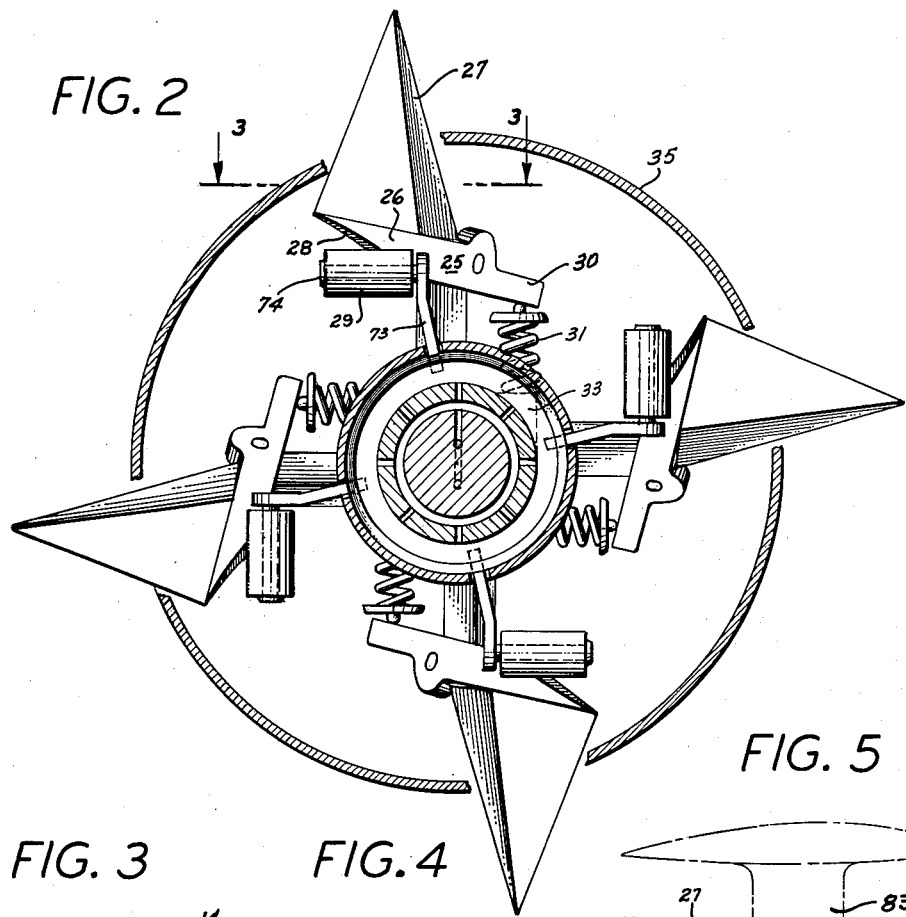
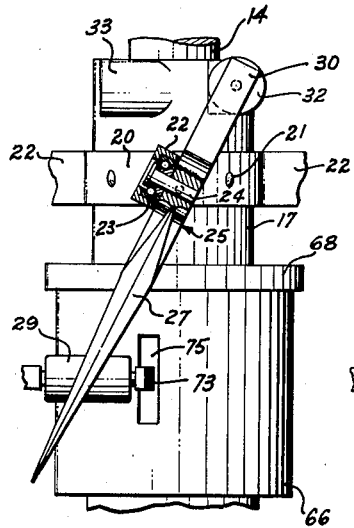
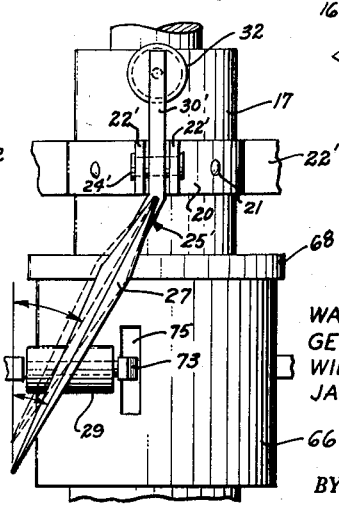
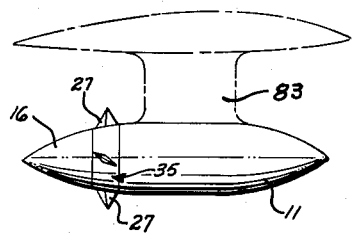
FIG. 2
FIG. 3  FIG. 4  FIG. 5
WARREN P. BOARDMAN, JR.,
GEORGE P. CARVER,
WILLIAM W. CARLTON,
JAMES C. WISE,
INVENTORS
BY R. E. Deangue
ATTORNEY May 30, 1961

W. P. BOARDMAN, JR., ET AL 2,986,219

FREESTREAM RAM AIR TURBINE

Filed May 27, 1957

WARREN P. BOARDMAN, JR.,
GEORGE P. CARVER,
WILLIAM W. CARLTON,
JAMES C. WISE,
INVENTORS

BY R. E. Granque

ATTORNEY

United States Patent Office 2,986,219
Patented May 30, 1961

2,986,219

FREESTREAM RAM AIR TURBINE

Warren P. Boardman, Jr., Granada Hills, and George P. Carver, Balboa, Calif., and William W. Carlton, Topsfield, Mass., and James C. Wise, Cleveland, Ohio, assignors to The Marquardt Corporation, a corporation of California Filed May 27, 1957, Ser. No. 661,832

16 Claims. (Cl. 170—74)

This invention relates to a freestream ram air turbine and more particularly to a ram air turbine for abstracting power from the airstream during supersonic flight of a piloted aircraft or missile in order to deliver this power at constant speed to rotary power units, such as electric alternators and pumps.

Prior ram air turbines, utilized as auxiliary power units for aircraft, have been of the type in which the rotor and blades of the turbine are located within a casing which confines the air flow, and the speed control of such turbines has been accomplished by air throttling means located within the casing. Further, such turbines have not provided for changing of the projected area, sweepback angle and angle of attack of the blades so that the blades can operate efficiently at high air velocities. In the present invention, the blades of the turbine are mounted within a streamline housing and extend through the housing into the airstream of the aircraft or missile. The blades can have the triangular planform of the delta airfoil and can be pivotally mounted to change the projected area and sweepback angle for efficient operation under varying flight speeds and power demands. Also, the blades can be of the straight supersonic type or of the straight subsonic type of airfoils, and these blades can be bodily moved inwardly and outwardly by a servo without pivoting the blades to change the sweepback. With either straight blades or blades of the triangular planform, the angle of attack of the blades can be varied with movement of the blades to obtain maximum lifting power from the blades.

The speed of the turbine of the present invention is held constant by a governor mechanism which moves the blades in the freestream to adjust the power output of the turbine. A change in speed of the turbine can originate either from a change in power requirement of the power unit or from a change in flight speed or altitude. If the flight speed and altitude of the aircraft remain constant, an increase in power requirement of the power unit will result in movement of the blades out into the airstream, and if the power requirement remains constant and the flight speed increases, the blades will be moved inwardly out of the airstream.

It is therefore an object of the present invention to provide a freestream ram air turbine having blades mounted within a streamline housing and extending through the housing into the airstream of an aircraft or missile.

Another object of the invention is the provision of a freestream ram air turbine having means for maintaining the turbine output at constant speed by varying the position of the turbine blades in the freestream of an aircraft or missile.

Another object of the present invention is to provide a freestream ram air turbine having blades which are in the form of a delta airfoil and which are pivotally moved into and out of the free airstream in order to change the efficient projected area of the blades and the sweepback angle of the blades.

Another object of the present invention is to provide a freestream ram air turbine having blades of triangular planform which are pivotally mounted to vary the projected area, sweepback angle and angle of attack to the freestream flowing past the turbine.

A further object of the invention is to provide a freestream ram air turbine having blades which are in the form of straight airfoils and which are moved radially into and out of the freestream to change the effective projected area of the blades, with or without an accompanying change in angle of attack.

These and other objects of the invention not specifically set forth above will become readily apparent from the acompanying description and drawings in which:

Figure 2 is a vertical section along line 2—2 of Figure 1 showing the projected area of the blades to the airstream and the pivotal mounting for the blades.

Figure 3 is a top plan view along line 3—3 of Figure 2 with the casing removed, illustrating the angular position of each of the turbine blades relative to the axis of the turbine.

Figure 4 is a plan view similar to Figure 3 showing a modification of the blade mounting which provides for change in angle of attack of the blade as the blade moves inwardly and outwardly.

Figure 5 is a reduced side elevational view illustrating the manner in which the ram air turbine of the present invention can be supported by a strut from the wing of an aircraft.

Figure 1:
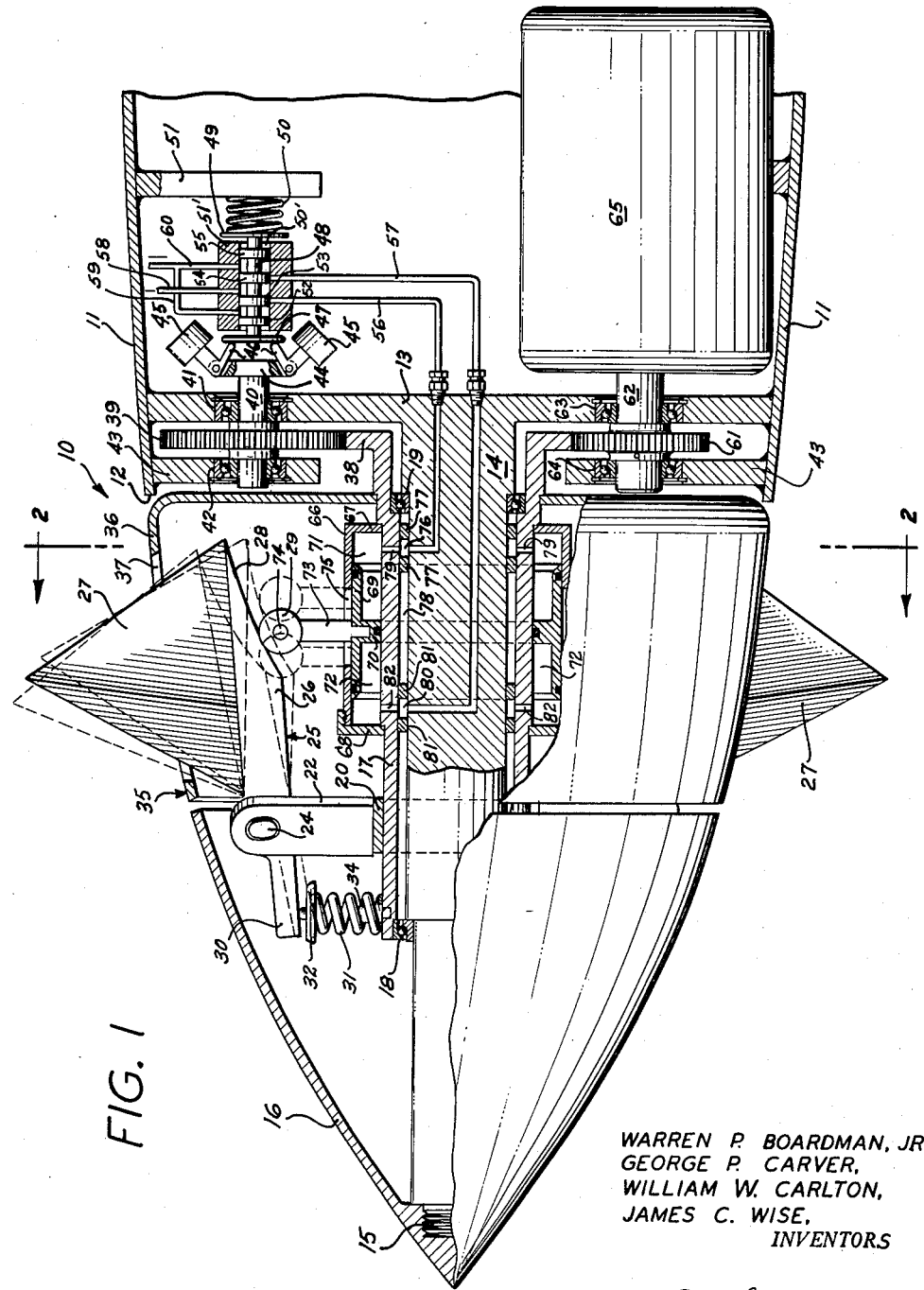
Figure 1 is a vertical section, partially in elevation, of the ram air turbine of the present invention, and illustrating the governor mechanism and servo for moving delta blades in and out of the airstream.

Referring to the embodiment of the invention illustrated in Figure 1, the turbine 10 has a casing 11 which is stationary and terminates at edge 12. A partition 13 is secured within casing 11 and supports a circular projection 14 which extends along the axial line of the turbine. The end 15 of this extension is threaded for attachment of the conical shaped nose portion 16. The rotor 17 for the turbine is in the form of a cylindrical tube which surrounds the projection 14 and is rotatably mounted thereon by means of ball bearings 18 and 19, which are located in stepped portions of the projection 14 and rotor 17, respectively. A band 20 surrounds the cylindrical rotor 17 and is secured thereto by screws 21. Four supports 22 are uniformly spaced around the band 20 and project radially outwardly therefrom. Each support 22 contains a cavity therein for ball bearings 23, which rotatably support a pin 24. Each pin 24 is fixed to an angularly positioned arm 25 and end 26 of each arm 25 supports a radially extending turbine blade 27. The inner surface of end 26 is formed by cam surface 28, which co-operates with a cam roller 29 in order to rotate the arm 25 about the pivot pin 24. The opposite end 30 of arm 25 is continuously biased outward by spring 31, which has one end bearing against a cap 32 in contact with the end 30 and the other end located on a flat portion 33 of the cylindrical rotor 17. As illustrated in Figure 3, each support 22 is angularly positioned with respect to the longitudinal axis of the turbine so that the flat portion 33 is located to one side of the center line of the turbine and the spring is held centered on the flat portion by a plug 34. Each of the rollers 29 is mounted for movement along the axis of the turbine in order to move each of the blades 27 in and out in the manner illustrated by the dotted line positions of Figure 1. An L-shaped casing section 35 is attached at one end to the rotor 17 and has a section 36 extending along the axis of the turbine in order to form a streamlined surface between casing 11 and nose portion 16. Section 36 contains four openings 37 through which four blades 27 project into the free airstream flowing past the turbine unit. Thus, the added drag due to the blades in the airstream is minimized by submerging all of the blades in a low drag, streamlined housing consisting of casing 11, section 35 and nose section 16.

The effect of the airstream on the blade portions extending through the openings 37 will be transmitted through the supports 22 to the rotor 17 and will cause rotation of the rotor 17, along with all the components carried thereby. End 38 of rotor 17 is in the form of a gear which meshes with a first gear 39 carried by a shaft 40, which is rotatably mounted by ball bearings 41 and 42 contained in partition 13 and support 43, respectively. The support 43 is in the form of a ring which extends around the circumference of the casing 11 and is attached thereto by welding or in any other suitable manner. A support plate 44 is attached to the end of shaft 40 and pivotally supports a pair of flyweights 45, each having a leg 46 bearing against a valve plate 47 carried by a valve stem 48. The opposite end of the valve stem has a plate 49 which receives the pressure of valve spring 50, which is located between the plate 49 and a support 51 attached to the casing 11. The valve stem 48 carries four lands 52, 53, 54 and 55 located in a cavity 50' of valve casing 51' and the lands 53 and 54 normally cover the passages 56 and 57, respectively, leading to the servo motor which controls the position of rollers 29. A fluid input passage 58 opens into cavity 50' between the lands 53 and 54 while exhaust passage 59 connects with the cavity between lands 52 and 53 and exhaust passage 60 connects with the cavity between lands 54 and 55. Thus, upon a change in speed of the turbine, the flyweights 45 can move inwardly or outwardly against the spring 50 and move the valve stem 48 in a direction to admit fluid either to passage 56 or 57 in order to correct the off-speed condition. The gear 38 at the end of the rotor 17 also meshes with a gear 61 which is secured to a shaft 62, rotatably mounted by bearings 63 and 64 in the partition 13 and in the circular support 43, respectively. The shaft 62 drives an alternator unit 65 but it is understood that the power unit could also be in the form of a hydraulic pump or the like.

In order to provide that the freestream turbine will drive the unit 65 at a constant speed with the required power output, a circular cylindrical member 66 is located around the rotor 17 and is secured thereto by end members 67 and 68 in order to form a fluid tight space. A second cylindrical member 69 is located within member 66 and has a circular projection 70 which divides the interior of member 66 into spaces 71 and 72. The member 69 and projection 70 have tight sliding fits with member 66 and rotor 17, respectively. Four arms 73 are spaced around the member 69 and extend outwardly so that each arm can support one of the rollers 29 by a pin 74 attached to the arm. Slots 75 are provided in the member 66 to permit the arms 73 to move along the axis of the turbine and member 69 is of sufficient length to continually cover these slots. The passage 56 passes through projection 14 into a space 76 defined by two rings 77 attached to rotor 17 and located in the space 78 between the projection and the rotor. The space 76 in turn connects with the space 71 through a number of passages 79 in the turbine rotor around its circumference. In a like manner, the passage 57 passes through the projection 14 and into the space 80 defined by two rings 81 located in space 78 between the projection and the turbine rotor 17 and the space 80 connects with the space 72 through a number of passages 82. It is therefore apparent that the circular projection 70 serves as a piston which separates spaces 71 and 72 and that the hydraulic servo valve controlled by the governor will serve to move the piston 70 and cylindrical member 69 along the axis of the turbine rotor 17 in order to move the roller longitudinally to the position which results in the desired speed of the turbine unit. As illustrated in Figure 3, the arms 25 supporting the blades 27 are located at an angle to the longitudinal axis of the turbine and the rollers 29 are made of sufficient width in order to continually contact the angular cam surface 28 during movement of the rollers longitudinally of the turbine.

Figure 6:
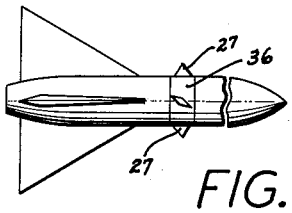
Figure 6 is a reduced top plan view of a missile, illustrating the manner in which the ram air turbine can be incorporated into the body of the missile.

During operation of the turbine, the cylinder 66, piston 70, casing section 36 and blades 27 will all rotate with rotor 17 about the projection 14, and rotation of the turbine rotor will drive the power unit 65 at a constant predetermined speed because of the control of the blade position by the governor. The freestream ramair turbine can be in the form of a self-contained unit mounted by strut 83 from the wing of an aircraft as illustrated in Figure 5, or the turbine can be contained in the body of a missile at any desired location as illustrated in Figure 6, in which case the rotable casing section 36 will conform to the contour of the missile body. The full line position of the blades in Figure 1 can represent an operating position for the blades to drive the power unit 65 at the desired constant speed. If the load of the unit 65 should increase, the turbine rotor will tend to slow down and the flyballs will move inwardly in response to this reduced speed. The inward movement of the flyballs will move the valve stem 48 to the left of Figure 1 and permit fluid to enter space 71 through passages 56 and 79. The high pressure fluid entering space 71 will act against the piston 70 to move the arms 73 and the rollers 29 to the left of Figure 1 and cause the blades 27 to move upward toward the upper dotted line position of Figure 1. Thus an increased blade area will be presented to the airstream in order to develop more power from the turbine in order to meet the increased requirements for the power unit 65, and the blade will be maintained in this new position by the governor and servo mechanism so long as the flight speed and altitude of the aircraft remain constant and the increased requirement of the power unit remain constant. Also, upon a decrease in the power load of the unit 65 the turbine will overspeed and the flyballs 45 will move outwardly in order to move the valve stem 48 to the right of Figure 1. This action will result in fluid entering the space 72 through the passages 57 and 82, in order to move the rollers 29 to the right in Figure 1 and cause the blades to be moved inwardly by the force of spring 31. The inward movement of the blades will reduce the area of the blades acted upon by the airstream and will reduce the power output of the turbine in order to return the turbine to the desired constant speed.

In the form of the invention illustrated in Figure 1, the pivotal movement of the blades 27 does not result in any change in angle of attack of the blades but does result in a change in the angle of sweepback of the blades, since the blades are in the form of delta airfoils. When the aircraft or missile carrying the turbine is moving at subsonic speed, the only power obtained from the blades results from the air pressure on the projected area presented by the blades to the airstream. However, when the missile or aircraft is flying at supersonic velocity, less blade area is required by the turbine because of the increased air force and also because of the fact that the blades provide a lift. Thus, for the same load on the turbine at supersonic velocities, less projected blade area will be required because of the increased force of the freestream and because of the lift available from the blades. Thus, the sweepback angle will also be increased at high flight speeds to prevent stalling of the blades.

When flight speed increases during a constant load, the speed of the turbine will increase from the desired constant value because of the increased force of the freestream and the flyballs will move outwardly in order to reduce the effective blade area by moving the blades inwardly. At the same time, the inward movement of the blades will increase the sweepback angle of the blades so that as the flight speed increases, the sweepback angle will increase to reduce drag due to shock loss and separation at hypersonic speed. Also, upon a decrease in flight speed, the blades will move outwardly and decrease the blade sweepback. Thus, it is apparent that at high flight speed, the blades will operate over an inward range of positions with a smaller projected area and a higher sweepback angle, whereas at lower flight speeds, the blades will operate over an outward range of positions with a larger projected area and smaller sweepback. Therefore, efficient turbine blade operation can be obtained at freestream speeds ranging from high subsonic to hypersonic velocity so that power can be efficiently abstracted from the airstream.

In Figure 4, a modification of the blade mounting is illustrated which permits the angle of attack, as well as the sweepback angle and projected blade area, to vary with blade position. In this modification, the band 20 has four pairs of projections 22' and support arms 25' for the blades 27 have ends 30' bent at an angle to the blades so that the ends 30' project along the axis of the turbine. A pin 24' passes through each pair of projections 22' and an end 30' in order to pivotally support a blade 27 and spring 31 acts against cap 32 to continually bias the blade toward the inward position. It is understood that each roller 29 acts against a cam surface 28 on the blades 27 in the same manner as in the previous embodiment in order to move the blades inwardly or outwardly upon actuation of the piston 70 by the governor. Because of the fact that the plane of the blades 27 is located at an angle to the mounting pivot pin 24', the blades will change their angle of attack upon movement by the rollers 29. As illustrated by the dotted line position of Figure 4, the angle of attack will increase as the blade moves outwardly. Thus, movement of the blades 27 of this modification will also result in change of the projected area and of the sweepback of the blades, in addition to change in the angle of attack. Upon an increase in load of the power unit 65, the resulting increased projected area of the blades will also result in a higher angle of attack so that more power will result from the freestream force on the blades. Upon an increase in flight speed, the blades will move inwardly to increase the sweepback and decrease the projected area and at the same time, the angle of attack will decrease to keep the blades from stalling.

Figure 7:
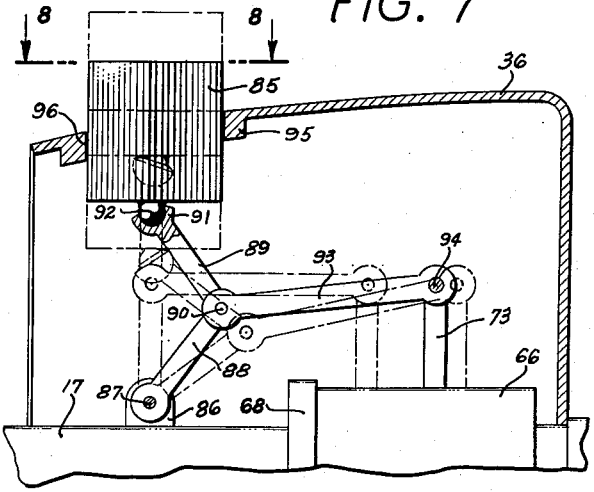
Figure 7 is a partial vertical section similar to Figure 2 showing a modification of the invention wherein straight supersonic diamond-shape airfoils are moved radially into the freestream by the servo.
Figure 8:
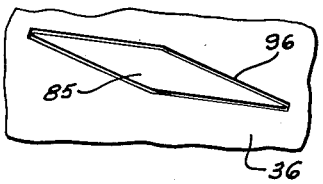
Figure 8 is a top plan view along line 8—8 of Figure 7 of the diamond shaped blades.

Referring to Figure 7, a modification of the invention is illustrated in which four straight blades 85 of diamond-shaped, supersonic airfoil section are utilized to drive the power unit 65. The piston 70 (not shown) is contained within the cylindrical member 66 and its movement is controlled by flyweights 45 in the same manner as illustrated in Figure 1. The piston 70 supports four arms 73 which serve to transmit the movement of the piston to the blades. Four brackets 86 are secured to the rotor 17 and each bracket has a mounting pin 87 for pivotally mounting one end of a link 88. The other end of each link 88 is connected to one end of a link 89 by a pivot pin 90, and the other end of each link 89 has a socket 91 for receiving a ball 92 secured to the inner edge of a blade 85. An arm 93 is connected to each pivot pin 90 and to each pivot pin 94 carried by an arm 73. The section 36 has enlarged portions 95 containing openings 96 just large enough to receive and support the blade 85 for radial movement relative to the rotor 17. As illustrated in Figure 8, the openings 96 are located at an angle to the rotor axis to provide the desired angle of attack for the blades 85. The dotted line positions of the blades in Figure 7 illustrate outward and inward positions of the blades 85, and the corresponding positions of the linkage mechanism, consisting of links 88, 89 and 93 are also illustrated. It is apparent that blades 85 can be positioned radially by arms 73 to obtain the required power output from the turbine to maintain the constant speed of power unit 65 which is driven from rotor 17.

Figure 9:
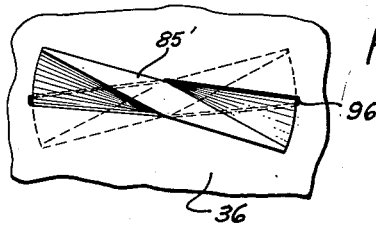
Figure 9 is a top plan view similar to Figure 8 illustrating a straight diamond-shaped blade which has been twisted to provide for change in angle of attack as the blades move through the casing.

While blades 85 are illustrated in Figures 7 and 8 as straight airfoil sections, the blades may be twisted about the longitudinal axis, as illustrated in Figure 9, to provide blades 85' and having a varying angle of attack along the leading edge of the blades. The blades 85' can be moved by the linkage shown in Figure 7 by connecting a ball 92 to the bottom edge of each blade 85'. The blades will be rotated by contact with casing 36 as they move through the support openings 96 and it will be apparent that the average angle of attack of the portion of the blades in the freestream will increase upon outward radial movement and will decrease upon inward radial movement, even though this angle varies along the blade. Thus, the embodiment of Figures 7 and 9 provide for increasing or decreasing the area of the blade in the freestream and the embodiment of Figure 9 also provides for changing the average angle of attack of the blades. It is understood that straight blades of various airfoil sections, including the usual straight subsonic airfoil, can be utilized in the same manner as blades 85 or 85'.

Figure 10:
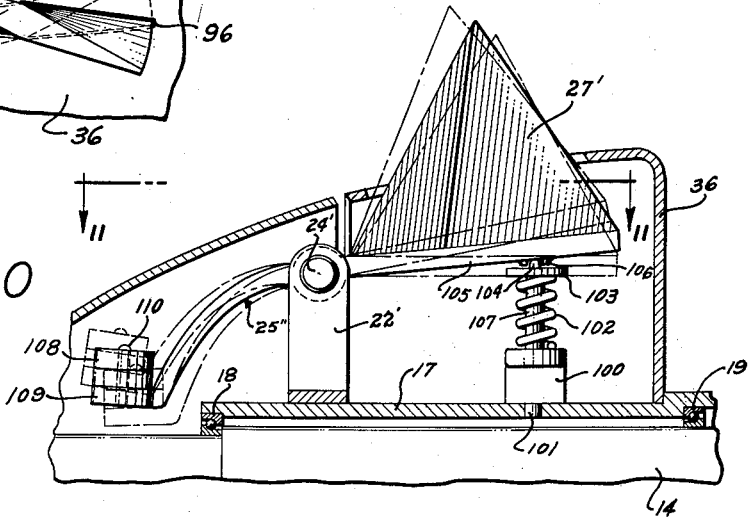
Figure 10 is a partial vertical section similar to Figure 2 showing a second modification of the invention wherein the flyweights are attached directly to the blades.
Figure 11:
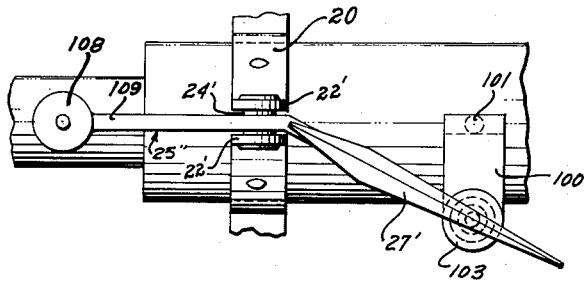
Figure 11 is a plan view along line 11—11 of Figure 10 with the casing removed, illustrating the angular position of the blades and the location of the flyweights.

Another modification of the invention is illustrated in Figures 10 and 11, wherein the piston 70 and speed responsive servo is replaced by an inertia mass attached directly to each of the blades. In this modification, the rotor 17 is rotatively mounted on the projection 14 by bearings 18 and 19 and the section 36 is attached to rotor 17 in the same manner as in the previous embodiments. Blades 27 of triangular planform are pivotally supported by pins 24' carried by projections 22' which are secured to the band 20 attached to the rotor 17. Four supports 100 are secured to the rotor 17 by pins 101 and these supports extend upwardly and to one side of the axis of rotor 17 in order to support one end of each spring 102. The other end of each spring carries a bearing plate 103, having a projection 104 which bears against the under surface of end 105 of arm 25' at a location between two nipples 106. A center part 107 serves to guide and position each spring and each exerts a force on a blade 27 to normally move it outwardly about pivot pin 24'.

A weight 108 is secured to the opposite end 109 of arm 25" by a pin 110 and since this weight rotates with the rotor 17 and projections 22', it will provide a centrifugal force in opposition to the force of spring 102. Thus, by properly selecting the characteristic of spring 102 and the mass of weight 108, the speed of the rotor 17 can be maintained at the desired constant speed. In determining the size of mass 108, the mass of the blade on the opposite side of the pivot pin will have to be compensated for. When the speed of the rotor 17 decreases, the force of spring 102 will overcome the inertial force of weight 108 and blades 27 will move outwardly to increase the power applied to the rotor shaft 17, and when the speed of the rotor increases, the weights 108 will move radially outwardly against the force of spring 102 to decrease the projected area of the blades and the power output of the turbine. While the blades 27 are mounted on an angular pivot pin in the manner illustrated in Figure 4, it is understood that the blades could also be mounted on a pivot pin arranged as shown in Figure 3. It is also apparent that the straight blades of Figures 7 and 9 could be attached directly to rotor 17 by coil springs rather than by the links 88, 89 and 93, so that the mass of the blades will provide a centrifugal force to position the blades in opposition to the action of the springs. By utilizing the force of inertia acting directly on the blades, the necessity for a separate speed responsive servo unit is eliminated.

It is therefore apparent that the gas turbine of the present invention is capable of abstracting power efficiently at freestream speeds ranging from subsonic to hypersonic velocities through the utilization of movable blades. It is understood that other types of supersonic airfoils can be used for the blades and that the turbine can also operate efficiently over suitable speed ranges with the subsonic type of airfoil. While four blades are illustrated around the turbine rotor, it is possible to increase or decrease the number of blades utilized and, of course, in place of hydraulic actuation of the blades, a suitable electric or pneumatic governor servo system could be utilized. Also, various types of mechanism, other than illustrated, can be utilized to obtain pivotal or radial movement of the blades in the various modifications and angular setting of the blades can be varied by these mechanisms to provide a different angle of attack or a different range of angles of attack. Various other modifications are contemplated by those skilled in the art without departing from the spirit and scope of the invention as hereinafter defined by the appended claims.

What is claimed is:

1. A ram air turbine operable by the freestream flow surrounding the turbine comprising a turbine casing containing a plurality of openings, a turbine rotor located within said casing, blade means supported by said rotor at an angle to the freestream and mounted for movement through said openings toward and away from said rotor for varying the area of said blade means presented to the freestream exteriorly of said casing, and means exteriorly of the casing and responsive to the speed of said turbine rotor for moving said blade means to maintain a constant turbine speed under varying freestream velocities and under varying power requirements.

2. A ram air turbine operable by the freestream surrounding the turbine, comprising a streamlined casing having a plurality of openings, a turbine rotor located within said casing, blade means pivotally mounted by said rotor at an angle to the freestream for movement through said openings to vary the area of the blades presented to the freestream and the sweepback angle of the blade means, and means responsive to the speed of said turbine rotor for pivoting said blade means to maintain a constant turbine speed under varying freestream velocities and under varying power requirements.

3. A ram air turbine as defined in claim 2 wherein the pivotal mounting for said blade means comprises pivot means for varying the angle of said blade means upon movement of the blade means in the freestream.

4. A ram air turbine operable by the freestream flow past the turbine, comprising a turbine rotor, a plurality of turbine blades mounted by said rotor at an angle to the freestream flow for movement toward and away from said rotor, a streamline casing for said turbine having openings through which said blades move to vary the area of the blades exteriorly of the casing and the projected area of the blades presented to the freestream, a power unit and a governor mechanism driven by said turbine rotor, said governor mechanism comprising speed responsive means and a servo means carried by said turbine rotor and operable by said speed responsive means, and means connected with said servo means for moving said blades in the freestream to maintain a constant speed of said turbine rotor.

5. A ram air turbine operable by the freestream flow past the turbine, comprising a turbine rotor, a plurality of turbine blades pivotally mounted by said rotor at an angle to the freestream flow for movement in the freestream to vary the projected area of the blades presented to the freestream and the sweepback angle of the blades, a streamline casing for said turbine having openings through which said blades move to vary said projected area, a power unit and a governor mechanism connected with said rotor to be driven thereby, said governor mechanism comprising speed responsive means and a servo means carried by said turbine rotor and operable by said speed responsive means, and means connected with said servo means for moving said blades in the freestream to maintain a constant speed of said turbine rotor.

6. A ram air turbine as defined in claim 5 wherein each of said blades has the shape of an airfoil of triangular planform, said blades having a large projected area and a lower angle of sweepback at high subsonic freestream velocities and having a smaller projected area and a larger sweepback angle at hypersonic freestream velocities.

7. A ram air turbine as defined in claim 5 wherein the pivotal mounting for each of said blades comprises a support projecting from said rotor and a pivot pin carried by said support for pivotally mounting each blade at a position adjacent the inner end of the leading edge, said moving means comprising a cam roller co-operating with a cam surface on the inner side of each blade to move the blade about said pivot pin.

8. A ram air turbine operable by the freestream flow past the turbine, comprising a turbine rotor, a plurality of turbine blades each in the form of a delta type airfoil, a streamline casing for said turbine having an opening for each of said blades, means for pivotally mounting said blades on said rotor in substantially radial position and at a fixed angle to the freestream flow corresponding to the angle of attack of said blades; and speed responsive means for pivotally moving said blades through said openings to vary the projected area of said blades and the sweepback angles of said blades to the freestream flow, the blades having a larger projected area and a lower sweepback angle at high subsonic freestream velocities than at hypersonic freestream velocities in order to maintain constant turbine speed.

9. A ram air turbine operable by the freestream flow past the turbine, comprising a turbine rotor, a plurality of turbine blades each in the form of a delta type airfoil, a streamline casing for said turbine having an opening for each of said blades, means for pivotally mounting said blades on said rotor in substantially radial position for movement in the freestream flow, said mounting means comprising a pivot pin so arranged to increase the angle of attack of said blades to the freestream as said blades move outwardly, and speed responsive means for pivotally moving said blades to vary the projected blade area, the sweepback angle and the angle of attack of said blades to the freestream flow, the blades having a larger projected area, lower sweepback angle and higher angle of attack at high subsonic freestream velocities than at hypersonic freestream velocities in order to maintain constant turbine speed.

10. A ram air turbine as defined in claim 9 wherein each of said blades is supported by an arm portion extending from said blades, said pivot pin being located in said arm at an angle to the plane of said blades to change the angle of attack as the blades move about the pivot pin.

11. A ram air turbine operable by the freestream flow past the turbine, comprising a turbine rotor, a plurality of turbine blades extending substantially radially outwardly from said rotor, a streamline casing for said turbine having openings through which said blades move toward and away from said rotor to vary the blade area exteriorly of the casing and the projected area of said blades to the freestream, means for movably mounting said blades on said rotor to increase the angle of attack of said blades as said blades move outwardly from said rotor, and means responsive to the speed of said turbine rotor for moving said blades to maintain a constant turbine speed under varying freestream velocities and under varying power requirements.

12. A ram air turbine operable by the freestream surrounding the turbine, comprising a casing for said turbine containing a plurality of openings, a turbine rotor located within said casing, blade means mounted for substantially radial movement with respect to the turbine rotor and through said openings to vary the total blade area of said blade means exteriorly of said casing and the projected area of the blade means presented to the freestream, and means responsive to the speed of said turbine rotor for moving said blade means to maintain a constant turbine speed under varying freestream velocities and under varying power requirements.

13. A ram air turbine operable by the freestream surrounding the turbine, comprising a casing for said turbine containing a plurality of openings, a turbine rotor located within said casing, blade means mounted for substantially radial movement with respect to the turbine rotor and through said openings to vary the total blade area of said blade means exteriorly of said casing and the projected area of the blade means presented to the freestream, and means responsive to the speed of said blade means to maintain a constant turbine speed under varying freestream velocities and under varying power requirements, said blade means comprising a plurality of straight turbine blades each having an airfoil cross section.

14. A ram air turbine as defined in claim 13, wherein each of said openings snugly receive one of said blades to support and guide said blade during radial movement, said speed responsive means comprising a governor mechanism connected with said turbine rotor, servo means controlled by said governor mechanism, and linkage means connected between said servo means and said blades.

15. A ram air turbine operable by the freestream surrounding the turbine, comprising a casing for said turbine containing a plurality of openings, a turbine rotor located within said casing, blade means mounted for substantially radial movement with respect to the turbine rotor and through said openings to vary the total blade area of said blade means exteriorly of said casing and the projected area of the blade means presented to the freestream, and means responsive to the speed of said turbine rotor for moving said blade means to maintain a constant turbine speed under varying freestream velocities and under varying power requirements, said blade means comprising a plurality of turbine blades each having a straight leading edge and being twisted along the length thereof, each of said openings snugly receiving one of said blades and have the same shape as the airfoil cross section of the blades in order to twist said blades during radial movement and vary the average angle of attack of the projected area of said blades.

16. A ram air turbine operable by the freestream flow surrounding the turbine comprising a turbine casing containing a plurality of openings, a turbine rotor located within said casing, blade means supported by said rotor at an angle to the freestream and mounted for movement through said openings toward and away from said rotor for varying the area of said blade means exteriorly of the casing and presented to the freestream exteriorly of said casing, and means responsive to the speed of said turbine rotor for moving said blade means to maintain a constant turbine speed under varying freestream velocities and under varying power requirements, said speed responsive means comprising biasing means for exerting a force on said blade means to move said blade means in one direction and inertia means responsive to the speed of said turbine rotor for exerting a force on said blade means to move said blade means in the opposite direction in opposition to the force of said biasing means.

References Cited in the file of this patent

UNITED STATES PATENTS

| | | |
|---|---|---|
| 191,168 | Nesbitt | May 22, 1877 |
| 1,435,791 | Baker | Nov. 14, 1922 |
| 2,324,569 | Everts | July 20, 1943 |
| 2,404,290 | Hoover | July 16, 1946 |
| 2,533,785 | Fumagalli | Dec. 12, 1950 |

FOREIGN PATENTS

| | | |
|---|---|---|
| 362,298 | Italy | Aug. 20, 1938 |